United States Patent
Loer et al.

(10) Patent No.: US 10,783,687 B2
(45) Date of Patent: *Sep. 22, 2020

(54) EFFICIENT DUPLICATE LABEL HANDLING

(71) Applicant: Mapbox, Inc., San Francisco, CA (US)

(72) Inventors: Christopher Jacob Loer, San Diego, CA (US); Ansis Brammanis, Toronto (CA); Nicki Zippora Dlugash, Washington D.C., DC (US); Molly Lloyd, San Francisco, CA (US)

(73) Assignee: Mapbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,421

(22) Filed: Oct. 7, 2019

(65) Prior Publication Data
US 2020/0043212 A1 Feb. 6, 2020

Related U.S. Application Data

(63) Continuation of application No. 15/987,719, filed on May 23, 2018, now Pat. No. 10,489,954.

(51) Int. Cl.
*G06T 11/60* (2006.01)
*G06T 11/00* (2006.01)
*G09B 29/00* (2006.01)

(52) U.S. Cl.
CPC ............ *G06T 11/60* (2013.01); *G06T 11/001* (2013.01); *G09B 29/003* (2013.01)

(58) Field of Classification Search
None
See application file for complete search history.

(56) References Cited

U.S. PATENT DOCUMENTS

| | | | |
|---|---|---|---|
| 5,724,072 A | 3/1998 | Freeman et al. | |
| 8,265,863 B2 | 9/2012 | Bowman et al. | |
| 8,274,524 B1 * | 9/2012 | Cornell | G08G 1/0969 345/428 |
| 8,633,930 B2 | 1/2014 | Mansfield | |
| 8,896,630 B1 * | 11/2014 | Miller | G06T 3/40 345/636 |

(Continued)

OTHER PUBLICATIONS

Lv, Dekui, et al. "The Algorithm Research and Implementation of MarkAvoiding Based on Grid." Proceedings of the 9th International Conference on Computer and Automation Engineering. ACM, 2017.

(Continued)

*Primary Examiner* — Ryan M Gray
(74) *Attorney, Agent, or Firm* — Fenwick & West LLP

(57) ABSTRACT

Techniques are described for efficient duplicate label handling. A vector tile is added to a render tree of an electronic map, the vector tile comprising a first set of labels. A vector tile family of the vector tile is identified, each vector tile of the family comprising a second set of labels. For each label of the first set, for each vector tile in the vector tile family, second labels from the second set are identified, and for each identified label, coordinates of the label of the first set are compared to coordinates of the identified label to determine whether the coordinates are within a threshold similarity of each other. Responsive to the determination, the label of the first set of labels is associated with an identifier with which the identified label is associated.

20 Claims, 9 Drawing Sheets

(56) References Cited

U.S. PATENT DOCUMENTS

| | | |
|---|---|---|
| 8,937,627 B1 | 1/2015 | Otero et al. |
| 9,001,126 B2 | 4/2015 | Burago |
| 9,448,754 B2 | 9/2016 | Baxter et al. |
| 9,483,496 B1 | 11/2016 | Washburne et al. |
| 2005/0137791 A1 | 6/2005 | Agrawala et al. |
| 2005/0187711 A1 | 8/2005 | Agrawala et al. |
| 2006/0218493 A1 | 9/2006 | Murray |
| 2007/0229311 A1 | 10/2007 | Bowman et al. |
| 2007/0229513 A1 | 10/2007 | Bowman |
| 2007/0229538 A1 | 10/2007 | Klassen et al. |
| 2007/0229541 A1 | 10/2007 | Klassen et al. |
| 2007/0233379 A1 | 10/2007 | Bowman et al. |
| 2007/0242084 A1 | 10/2007 | Bowman et al. |
| 2008/0036787 A1 | 2/2008 | Gelber |
| 2008/0036788 A1 | 2/2008 | Gelber |
| 2011/0275390 A1 | 11/2011 | Bowman et al. |
| 2013/0187939 A1 | 7/2013 | Rohlf |
| 2013/0342545 A1 | 12/2013 | Appleton et al. |
| 2014/0092093 A1 | 4/2014 | Murray |
| 2014/0204116 A1* | 7/2014 | Maurer ............... G06F 3/0481 345/619 |
| 2014/0210854 A1 | 7/2014 | Gelber |
| 2014/0218396 A1 | 8/2014 | Gelber |
| 2014/0253577 A1* | 9/2014 | Jang .................... G09B 29/007 345/589 |
| 2014/0300607 A1 | 10/2014 | Gelber |
| 2014/0300631 A1 | 10/2014 | Gelber |
| 2014/0354629 A1 | 12/2014 | Adlers et al. |
| 2015/0187100 A1 | 7/2015 | Berry et al. |
| 2015/0187337 A1 | 7/2015 | Baxter et al. |
| 2016/0055669 A1 | 2/2016 | Piemonte et al. |
| 2016/0071298 A1 | 3/2016 | Liu et al. |
| 2017/0052654 A1* | 2/2017 | Cervelli ............... G06T 19/006 |
| 2017/0336215 A1* | 11/2017 | Racz .................... G01C 21/32 |
| 2018/0107346 A1 | 4/2018 | Wilson |
| 2019/0005696 A1* | 1/2019 | Mccloskey ............ G06F 16/29 |

OTHER PUBLICATIONS

United States Office Action, U.S. Appl. No. 15/987,687, dated Jun. 28, 2019, 21 pages.

Xiao-yan, Shao, He Lei, and Peng Xuan. "Novel algorithm of label placement in digital map based on grid." 2010 Second International Conference on Communication Systems, Networks and Applications. vol. 2. IEEE, 2010.

United States Office Action, U.S. Appl. No. 16/576,770, dated Apr. 29, 2020, 13 pages.

* cited by examiner

EFFICIENT DUPLICATE LABEL HANDLING

CROSS-REFERENCE TO RELATED APPLICATIONS

This application is a continuation of U.S. application Ser. No. 15/987,719, filed May 23, 2018, which is incorporated by reference herein in its entirety.

TECHNICAL FIELD

The disclosure relates generally to the field of generating electronic maps and specifically to the rendering and animation of labels within electronic maps when displayed upon displays of computing devices.

BACKGROUND

Digitally stored electronic maps are used to provide directions to users of mobile and other computing devices, for example, using any of a wide array of standalone map or direction application programs or apps. Today's electronic maps correctly determine where a mobile device is within a few feet or meters, and can show where the user of that mobile device is on the electronic map in real time. Additional elements such as labels may also be shown to better orient the user.

Electronic maps also appear in other applications aside from standalone mapping applications. For example, ride sharing applications, taxi applications, video games, and other applications may use electronic maps. These or other applications can obtain electronic maps by calling a map server computer through an Application Programming Interface (API). Thus, a single electronic map provider that owns or operates the server computer may supply the electronic maps for many different applications.

SUMMARY

Geographical maps are increasingly created and stored in an electronic format, and represent spatial aspects of a given area. In many use cases of electronic maps it is desirable to represent geographic information in a visually pleasing and comprehensible manner. For example, in many use cases it is desirable that labels upon the map do not overlap or "collide."

In one embodiment, a first method involves adding a vector tile to a render tree of an electronic map, wherein the vector tile comprises a first set of labels and each label of the first set of labels comprises a type of label. A vector tile family of the vector tile is identified, wherein each vector tile of the vector tile family comprises a second set of labels. For each label of the first set of labels, coordinates of the label are converted to global coordinates, and for each vector tile in the vector tile family, labels of the second set of labels comprising the type of label are identified; and for each identified label of the set of second labels, the coordinates of the label of the first set of labels are compared to coordinates of the identified label to determine whether the coordinates of the label of the first set of labels and the coordinates of the identified label are within a threshold similarity of each other. Responsive to the determination, the label of the first set of labels is associated with an identifier with which the identified label is associated.

Figure 1:
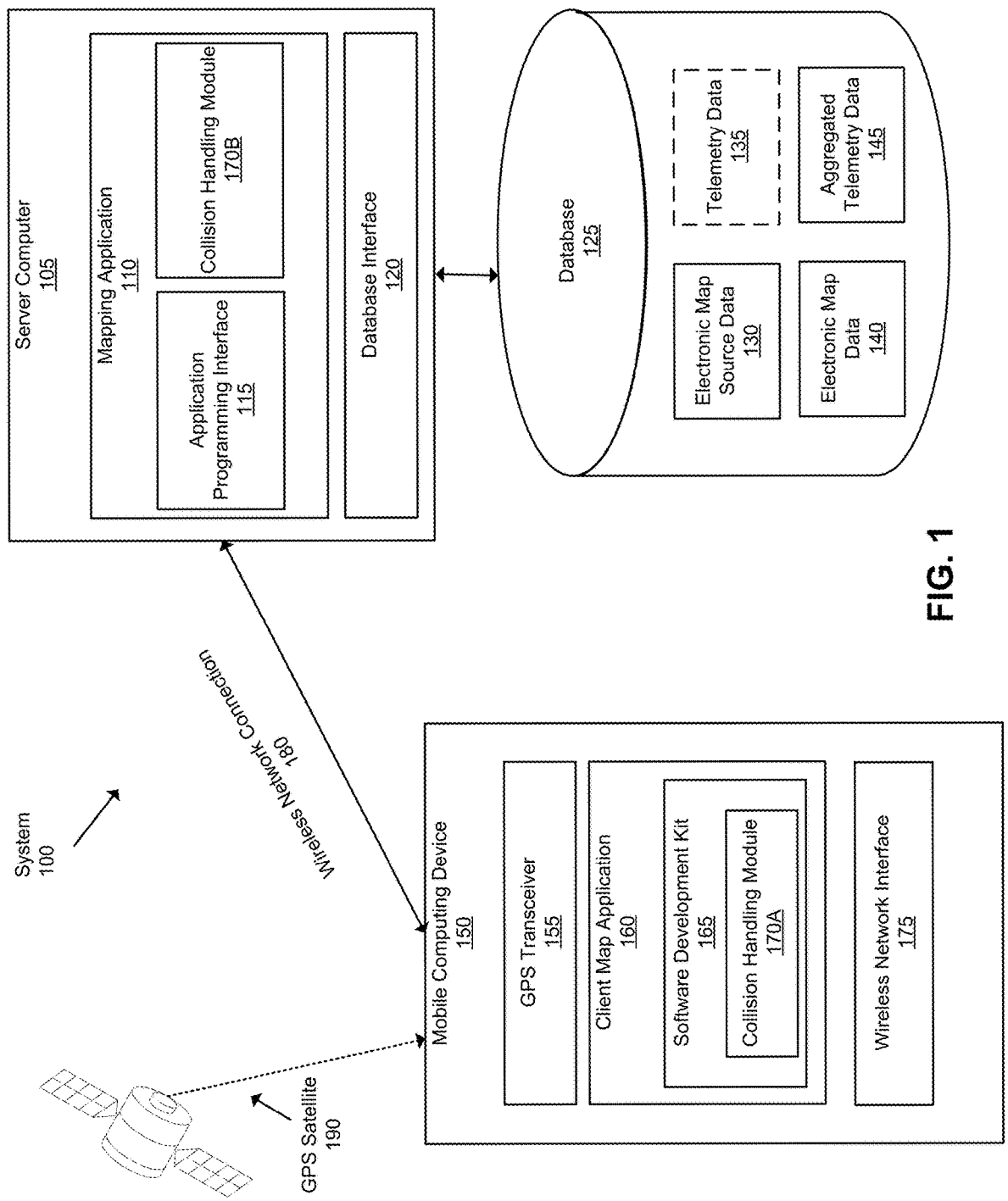
FIG. 1 illustrates an example computer system in which the techniques described may be practiced, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

I. General Overview

How to best label map features, especially on an electronic map, is an ongoing problem. The problem is further complicated when electronic maps are capable of rotating, panning, pitching, and zooming in and out, which can change the representation of map features including labels, and may subsequently cause labels to become cluttered or overlap. The problem is exacerbated when electronic map data is drawn from multiple independent sources, requiring cross coordination. As detailed below, a novel approach to collision handling for labels improves the comprehensibility of electronic maps while more efficiently selecting labels for display.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Vector tiles are vector data similar to image tiles for web mapping. Vector tiles define geometries and properties of an electronic map, but not full visual style. The same vector tiles can be used to generate maps of varying visual styles—a dark, nighttime style can use the same vector tiles as a light, daytime style for visualization, for example. Styles are sets of rules, created independently of vector tiles, which define the visual appearance of an electronic map when it is rendered. A style can include information about data sources, style layers, sprites, glyphs, and metadata, for example.

Vector data can include geometry data representing map features such as roads, bodies of water, public parks, buildings, and so on, as well as metadata corresponding to map features, such as textual labels. An electronic map is rendered from one or more vector tiles when requested by a client, such as a web browser or a mobile application, by applying a styling to the vector data of the vector tiles to create one or more layers used to visualize map features. Map features can be represented in a rendered electronic map by graphical elements, which are used to convey map information to a user of the electronic map. Graphical elements may include, for example, lines, textures, and colors. Each layer is a stylized representation of a portion of an electronic map based on both vector data and styling rules. For example, one layer may represent all highways within the geographic area represented by an electronic map. A second layer may include label graphical elements that label other graphical elements within the electronic map. Depending upon the embodiment, there may be one or more layers including label graphical elements, for example, a first layer including label graphical elements that label road graphical elements, and a second layer including label graphical elements that label city graphical elements. An electronic map including more than one layer renders the layers one at a time in a predetermined order of highest priority layer to lowest priority layer. Layer priority may be based on the content of each layer, or may be set by a creator of the electronic map. Layer priority is managed by a collision handling module 170, detailed infra.

A label is a text string or icon used to identify something. Label graphical elements are icons and/or strings of text represented upon an electronic map to identify other, associated graphical elements. For example, a road graphical element may have an associated label graphical element including a text string "University Avenue" which is rendered upon the electronic map adjacent to or overlaying the road graphical element. Label graphical elements can be styled similar to other graphical elements. A style can affect the size, font, color, highlighting, kerning, displayed text, or so on, of a label graphical element. For example, for a label graphical element with text string "University Avenue," one style may cause a Times New Roman size 12 rendering of "University Avenue" in black, while a second style may cause a Calibri size 10 rendering of "University Ave" in red.

The electronic map may be displayed at any of a plurality of zoom levels. For example, electronic maps may be displayed at zoom levels from 0 to 22; in some embodiments, incremental zoom levels may be selected, such as 2.01, 2.02, or other fractional zooms. In an embodiment, zooming is continuous from a maximum level to a minimum level and vice versa. Each zoom level corresponds with one or more vector tiles for that level, as well as with one or more styles, which can change as the electronic map is zoomed in or out. For example, the opacity of a line may change as a function of zoom level. Similarly, different layers may be displayed at different zoom levels, and those different layers may use different geometry data and metadata depending upon their specific associated vector tiles. In an embodiment, each layer has an associated set of labels for graphical elements of the layer. Labels are added in order by layer, with labels of a higher priority layer placed upon the electronic map before labels of a lower priority layer.

The electronic map can be displayed at a number of combinations of zoom, bearing, and pitch, and may be panned to display different sections of the electronic map. Adjusting the zoom, bearing, or pitch may change which graphical elements are rendered, including label graphical elements, and/or how they are rendered. For example, when zoom level changes from level 2 (z2) to level 3 (z3) and z3 vector tiles (with data other than or additional to that of the z2 vector tiles) are loaded and used for rendering, additional graphical elements not included in the z2 vector tiles (but included in the z3 vector tiles) are rendered. Henceforth in this specification a zoom level may be referred to by "z" followed by its numerical value, such as z3. Vector tiles may likewise be referred to by a specific associated zoom level, such as z3 vector tiles. Similarly, a label graphical element may be referred to as a "label" and a graphical element in general may be referred to as a "symbol."

II. System Overview

Computer-implemented techniques are provided for rendering electronic maps with collision handling for label graphical elements. FIG. 1 illustrates an example computer system in which the techniques provided may be practiced, according to one embodiment.

FIG. 1 uses like reference numerals to identify like elements. A letter after a reference numeral, such as "115A," indicates that the text refers specifically to the element having that particular reference numeral. A reference numeral in the text without a following letter, such as "115," refers to any or all of the elements in the figures bearing that reference numeral. For example, "115" in the text refers to reference numerals "115A," and/or "115B" in the figures.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 150 that is coupled via a wireless network connection 180 to a server computer 105, which is coupled to a database 125. A GPS satellite 190 is coupled via a wireless connection to the mobile computing device 150. The server computer 105 comprises a mapping application 110, an application programming interface (API) 115, a collision handling module 170B and a database interface 120. The database 125 comprises electronic map source data 130, electronic map data 140, telemetry data 135, and aggregated telemetry data 145. The mobile computing device 150 comprises a GPS transceiver 155, client map application 160, software development kit (SDK) 165, collision handling module 170A, and wireless network interface 175.

II.A. Server and Database

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 125 and mobile computing device 150 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 120, to facilitate various aspects of embodiments described herein.

In one embodiment, database interface 120 is a programmatic interface such as JDBC or ODBC for communicating with database 125. Database interface 120 may communicate with any number of databases and any type of database, in any format. Database interface 120 may be a piece of custom software created by an entity associated with mapping application 110, or may be created by a third party entity in part or in whole.

In one embodiment, database 125 is a data storage subsystem consisting of programs and data that is stored on any suitable storage device such as one or more hard disk drives, memories, or any other electronic digital data recording device configured to store data. Although database 125 is depicted as a single device in FIG. 1, database 125 may span multiple devices located in one or more physical locations. For example, database 125 may include one or more nodes located at one or more data warehouses. Additionally, in one embodiment, database 125 may be located on the same device or devices as server computer 105. Alternatively, database 125 may be located on a separate device or devices from server computer 105.

Database 125 may be in any format, such as a relational database, a noSQL database, or any other format. Database 125 is communicatively connected with server computer 105 through any kind of computer network using any combination of wired and wireless communication of the type previously described. Optionally, database 125 may be communicatively connected with other components, either directly or indirectly, such as one or more third party data suppliers. Generally, database 125 stores data related to electronic maps including, but not limited to: electronic map source data 130, electronic map data 140, telemetry data 135, and aggregated telemetry data 145. These datasets may be stored as columnar data in a relational database or as flat files.

In one embodiment, electronic map source data 130 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 130 may be updated at any suitable interval, and may be stored for any amount of time. Once obtained or received, electronic map source data 130 is used to generate electronic map data 140.

In one embodiment, electronic map data 140 is digital map data that is provided, either directly or indirectly, to client map applications, such as client map application 160, using an API. Electronic map data 140 is based on electronic map source data 130. Specifically, electronic map source data 130 is processed and organized as a plurality of vector tiles which may be subject to style data to impose different display styles, and which may be organized in a tile pyramid. Electronic map data 140 may be updated at any suitable interval, and may include additional information beyond that derived from electronic map source data 130. For example, using aggregated telemetry data 145, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 145.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 145 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 145 is stored in association with one or more tiles related to electronic map data 140. Aggregated telemetry data 145 may be stored for any amount of time, such as a day, a week, or more. Aggregated telemetry data 145 may be further processed or used by various applications or functions as needed.

II.B. Mobile Computing Device

In one embodiment, mobile computing device 150 is any mobile computing device, such as a laptop computer, handheld computer, wearable computer, cellular or mobile phone, portable digital assistant (PDA), or tablet computer. Alternatively, mobile computing device 150 could be a desktop computer or an interactive kiosk. Although a single mobile computing device is depicted in FIG. 1, any number of mobile computing devices may be present. Each mobile computing device 150 is communicatively connected to server computer 105 through wireless network connection 180 which comprises any combination of a LAN, a WAN, one or more internetworks such as the public Internet, a cellular network, or a company network.

Mobile computing device 150 is communicatively coupled to GPS satellite 190 using GPS transceiver 155. GPS transceiver 155 is a transceiver used by mobile computing device 150 to receive signals from GPS satellite 190, which broadly represents three or more satellites from which the mobile computing device may receive signals for resolution into a latitude-longitude position via triangulation calculations.

Mobile computing device 150 also includes wireless network interface 175 which is used by the mobile computing device to communicate wirelessly with other devices. In particular, wireless network interface 175 is used to establish wireless network connection 180 to server computer 105. Wireless network interface 175 may use WiFi, WiMAX, Bluetooth, ZigBee, cellular standards or others.

Mobile computing device 150 also includes collision handling module 170A which is used by the mobile computing device as part of the client map application 160 to provide label collision handling functionality. In some embodiments collision handling module 170A collaborates with collision handling module 170B of the server computer 105 to provide label collision handling functionality. Alternatively, either collision handling module 170A or collision handling module 170B solely provides label collision handling functionality, in which case the other module may not be present in the system.

Mobile computing device 150 also includes other hardware elements, such as one or more input devices, memory, processors, and the like, which are not depicted in FIG. 1. Mobile computing device 150 also includes applications, software, and other executable instructions to facilitate various aspects of embodiments described herein. These applications, software, and other executable instructions may be installed by a user, owner, manufacturer, or other entity related to mobile computing device 150. In one embodiment, mobile computing device 150 includes client map application 160 which is software that displays, uses, supports, or otherwise provides electronic mapping functionality as part of the application or software. Client map application 160 may be any type of application, such as a taxi service, a video game, a chat client, a food delivery application, etc. In an embodiment, client map application 160 obtains electronic mapping functions through SDK 165, which may implement functional calls, callbacks, methods or other programmatic means for contacting the server computer to obtain digital map tiles, layer data, or other data that can form the basis of visually rendering a map as part of the application. In general, SDK 165 is a software development kit that allows developers to implement electronic mapping without having to design all of the components from scratch. For example, SDK 165 may be downloaded from the Internet by developers, and subsequently incorporated into an application which is later used by individual users.

In server computer 105, the mapping application 110 provides the API 115 that may be accessed, for example, by client map application 160 using SDK 165 to provide electronic mapping to client map application 160. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 145, receiving electronic map source data 130 from data providers, processing electronic map source data 130 to generate electronic map data 140, and any other aspects of embodiments described herein. Mapping application 110 includes collision handling module 170B which may be used to enable label collision handling functionality on client map application 160. Depending upon embodiment, label collision handling functionality may be provided wholly on the mobile computing device 150 via collision handling module 170A, wholly on the server computer 105 via collision handling module 170B, or in part by each collision handling module 170 working in conjunction.

II.C. Hardware Environment

According to one embodiment, the techniques described herein are implemented by one or more special-purpose computing devices. For example, the server computer 105 and mobile computing device 150 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
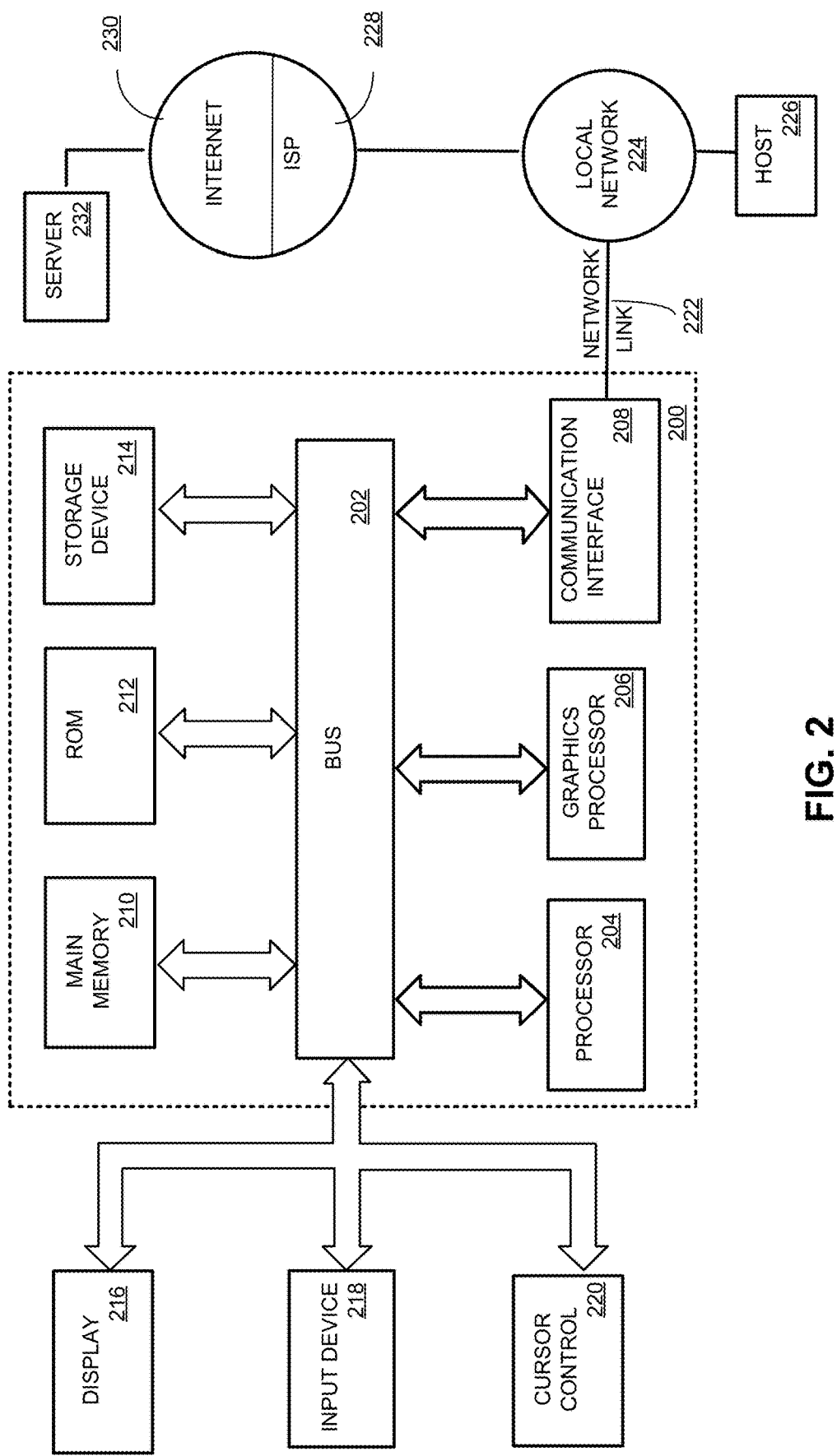
FIG. 2 is a block diagram that illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor (CPU) 204 and graphics processor (GPU) 206 coupled with bus 202 for processing information. CPU 204 may be, for example, a general purpose microprocessor. GPU 206 may be, for example, a graphics processing unit with a high core count which is optimized for parallel processing and graphics rendering.

Computer system 200 also includes a main memory 210, such as a random access memory (RAM) or other dynamic storage device, coupled to bus 202 for storing information and instructions to be executed by CPU 204. Main memory 210 also may be used for storing temporary variables or other intermediate information during execution of instructions to be executed by CPU 204 and/or GPU 206. Such instructions, when stored in non-transitory storage media accessible to CPU 204 and/or GPU 206, render computer system 200 into a special-purpose machine that is customized to perform the operations specified in the instructions.

Computer system 200 further includes a read only memory (ROM) 212 or other static storage device coupled to bus 202 for storing static information and instructions for CPU 204 and/or GPU 204. A storage device 214, such as a magnetic disk or optical disk, is provided and coupled to bus 202 for storing information and instructions.

Computer system 200 may be coupled via bus 202 to a display 216, such as an LCD screen, LED screen, or touch screen, for displaying information to a computer user. An input device 218, which may include alphanumeric and other keys, buttons, a mouse, a touchscreen, and/or other input elements is coupled to bus 202 for communicating information and command selections to CPU 204 and/or GPU 206. In some embodiments, the computer system 200 may also include a cursor control 220, such as a mouse, a trackball, or cursor direction keys for communicating direction information and command selections to CPU 204 and/or GPU 206 and for controlling cursor movement on display 216. The cursor control 220 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to CPU 204 and/or GPU 206 executing one or more sequences of one or more instructions contained in main memory 210. Such instructions may be read into main memory 210 from another storage medium, such as storage device 214. Execution of the sequences of instructions contained in main memory 210 causes CPU 204 and/or GPU 206 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 214. Volatile media includes dynamic memory, such as main memory 210. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to CPU 204 and/or GPU 206 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 210, from which CPU 204 and/or GPU 206 retrieves and executes the instructions. The instructions received by main memory 210 may optionally be stored on storage device 214 either before or after execution by CPU 204 and/or GPU 206.

Computer system 200 also includes a communication interface 208 coupled to bus 202. Communication interface 208 provides a two-way data communication coupling to a network link 222 that is connected to a local network 224. For example, communication interface 208 may be an integrated services digital network (ISDN) card, cable modem, satellite modem, or a modem to provide a data communication connection to a corresponding type of telephone line. As another example, communication interface 208 may be a local area network (LAN) card to provide a data communication connection to a compatible LAN. Wireless links may also be implemented. In any such implementation, communication interface 208 sends and receives electrical, electromagnetic or optical signals that carry digital data streams representing various types of information.

Network link 222 typically provides data communication through one or more networks to other data devices. For example, network link 222 may provide a connection through local network 224 to a host computer 226 or to data equipment operated by an Internet Service Provider (ISP) 228. ISP 228 in turn provides data communication services through the world wide packet data communication network now commonly referred to as the "Internet" 230. Local network 224 and Internet 230 both use electrical, electromagnetic or optical signals that carry digital data streams. The signals through the various networks and the signals on network link 222 and through communication interface 208, which carry the digital data to and from computer system 200, are example forms of transmission media.

Computer system 200 can send messages and receive data, including program code, through the network(s), network link 222 and communication interface 208. In the Internet example, a server 232 might transmit a requested code for an application program through Internet 230, ISP 228, local network 224 and communication interface 208. The received code may be executed by CPU 204 and/or GPU 206 as it is received, and stored in storage device 214, or other non-volatile storage for later execution.

III. Tile Pyramid

Figure 3:
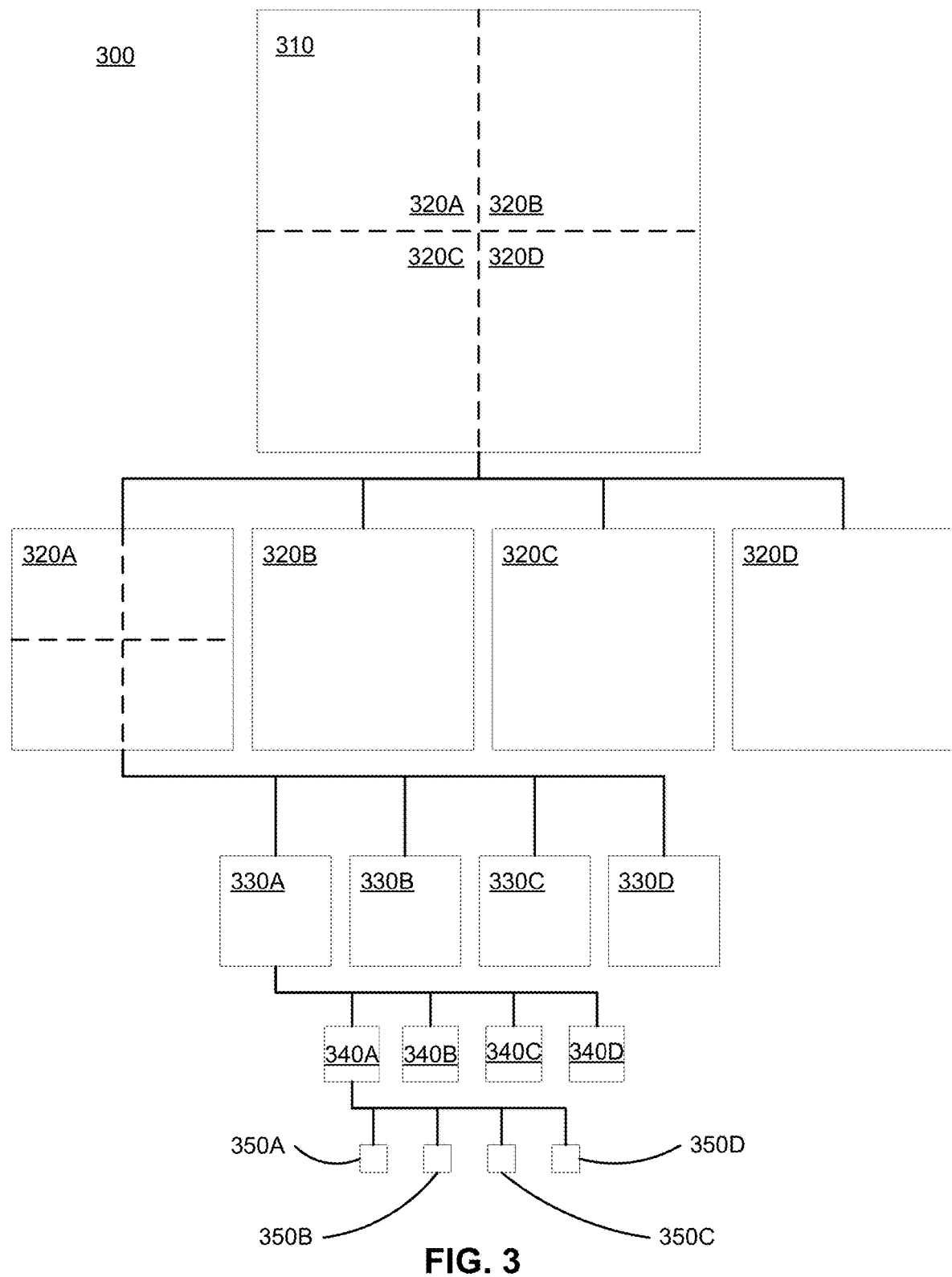
FIG. 3 illustrates a simplified tile pyramid, according to one embodiment.

FIG. 3 illustrates a simplified tile pyramid 300, according to one embodiment. A tile pyramid is a tree of vector tiles. The root of the tree is a singular z0 vector tile 310 with high level vector data for the entire geographic area captured by the electronic map. For example, the z0 vector tile 310 of a world map would define high level geometries and properties for the entire world, such as continents, oceans, and national borders.

This example z0 vector tile 310 has four children, each a z1 vector tile (vector tiles 320A-D) that has more detailed vector data for a quarter of the z0 vector tile. The quarter of the z0 vector tile 310 represented by each z1 vector child is, for example, a Cartesian quadrant of the parent z0 vector tile 310, as represented by dashed lines upon the z0 vector tile 310 in the figure. The more specific vector data each z1 vector tile 320 includes may be, for example, state borders, major rivers and lakes, and mountain ranges. Each z1 vector tile 320 can include vector data similar to that of the z0 vector tile 310. For example, if vector tile 320B includes vector data for both Europe and Asia, a continental border may be included in the vector data.

Similarly, in this example each z1 vector tile 320 has four children in the tree, which each represent a quarter of their respective parent. For example, z1 vector tile 320A has z2 vector tiles 330A-D as children. Each z2 vector tile 330 has more detailed vector data than that of its parent z1 vector tile 320A, similar to how each z1 vector tile 320 included more detailed vector data than their parent, the z0 vector tile 310. For example, each z2 vector tile 330 vector data may include data for major cities, major highways, and forests, plains, deserts and other large geographic features.

In a similar manner, this example tree grows with each zoom level, with each child vector tile having its own four children until a maximum zoom level is reached. z2 vector tile 330A has children z3 vector tiles 340A-D, z3 vector tile 340a has children z4 vector tiles 350A-D, and so on, up to a maximum zoom level. For example, if zoom levels range from 0 to 22, the highest, most zoomed out level, z0, has 1 z0 vector tile 310, the next level, z1, has 4 vector tiles 320, z2 has 16 vector tiles including vector tiles 330, z3 has 64 vector tiles including vector tiles 340, and so on. As zoom level increases, vector tiles show a more geographically-granular level of detail while representing a smaller overall geographic area. While the z0 vector tile 310 may represent the entire world, a z22 vector tile may represent a cul-de-sac or a similarly small geographic area and the features therein.

There is a unique path traversing the tree from the root z0 vector tile 310 to each subsequent vector tile at each zoom level, all the way to leaf vector tiles at the other end of the tree (representing the highest zoom level). For example, there is a unique path from the z0 vector tile 310 to z4 vector tile 350A, traversing vector tiles 320A, 330A, and 340A. In an embodiment, when detecting duplicate labels for a certain vector tile, it is other vector tiles in the certain vector tile's unique path that are queried (the vector tile's "vector tile family"), which can include all parents and children of the certain vector tile. This is discussed in further detail infra in section VII. Duplicate Detection.

The tile tree is managed by the collision handling module 170 and, as detailed supra with regard to FIG. 2, is stored in the database 125 as individual vector tiles. In one embodiment, the entire vector tile family of a vector tile is queried against when detecting duplicates. In another embodiment, the collision handling module 170 queries only those vector tiles of a vector tile family that are used for the rendering at the time of the query (vector tiles of the vector tile family that are in the "render tree" at a particular instant). For example, if a rendered electronic map uses vector data from only the z0 vector tile 310 and z1 vector tiles 320A and 320B, and z2 vector tile 330A is subsequently added, then when detecting duplicates for the z2 vector tile 330A, only the z1 vector tile 320A and the z0 vector tile 310 are queried, rather than those and all children of z2 vector tile 330A. In this manner less queries need be performed, conserving computer resources such as processor clock cycles. Furthermore, fewer vector tiles (e.g., only the queried tiles) may need to be stored in main memory 210 for further computation, thereby more efficiently using the main memory 210, freeing more memory for other use. In this example it is not necessary to query the children of the z2 vector tile 330A because no data from the children is used in the rendered electronic map, and duplicate labels in unused vector tiles do not affect the rendered electronic map. Depending upon the embodiment, the vector tile family comprises both every parent and child of a vector tile, or only those parents and children also in the render tree.

A vector tile with the highest zoom level in its family in the render tree may be referred to as a "front-most" vector tile. In one embodiment, only graphical elements (such as labels) from front-most vector tiles are rendered. As such, the rendered electronic map may include vector data from vector tiles of different zoom levels depending upon which vector tiles have been added to the render tree and which of those vector tiles have been rendered. For example, if two vector tiles of level z2 are added to the render tree of an electronic map currently rendering z1 vector tiles, first one z2 vector tile is rendered, then the second; in between the rendering of the first and second z2 vector tiles, vector data from the first z2 vector tile and vector data from one or more z1 vector tiles are rendered simultaneously, as the second z2 vector tile is not yet rendered. However, as the z2 vector tile is front-most, its vector data is swapped in for the remaining z1 vector data once it is rendered.

Each vector tile in the tile pyramid 300 may have its own coordinate system. In this case, the z0 vector tile 310 coordinate system is a "global coordinate system" to which all other vector tiles can be mapped. For example, each z1 vector tile 320 coordinate system covers one fourth the area of the z0 vector tile 310 global coordinate system. As such, in this example there is a power of 2 relationship among coordinates of zoom levels one level of the tree apart from each other, however this relation may vary depending on tree structure and/or the relative geographic area represented by vector tiles of successive zoom levels. In an embodiment, vector tile coordinates converted to global coordinates are rounded down.

IV. Bounding Geometries

Figure 4A:
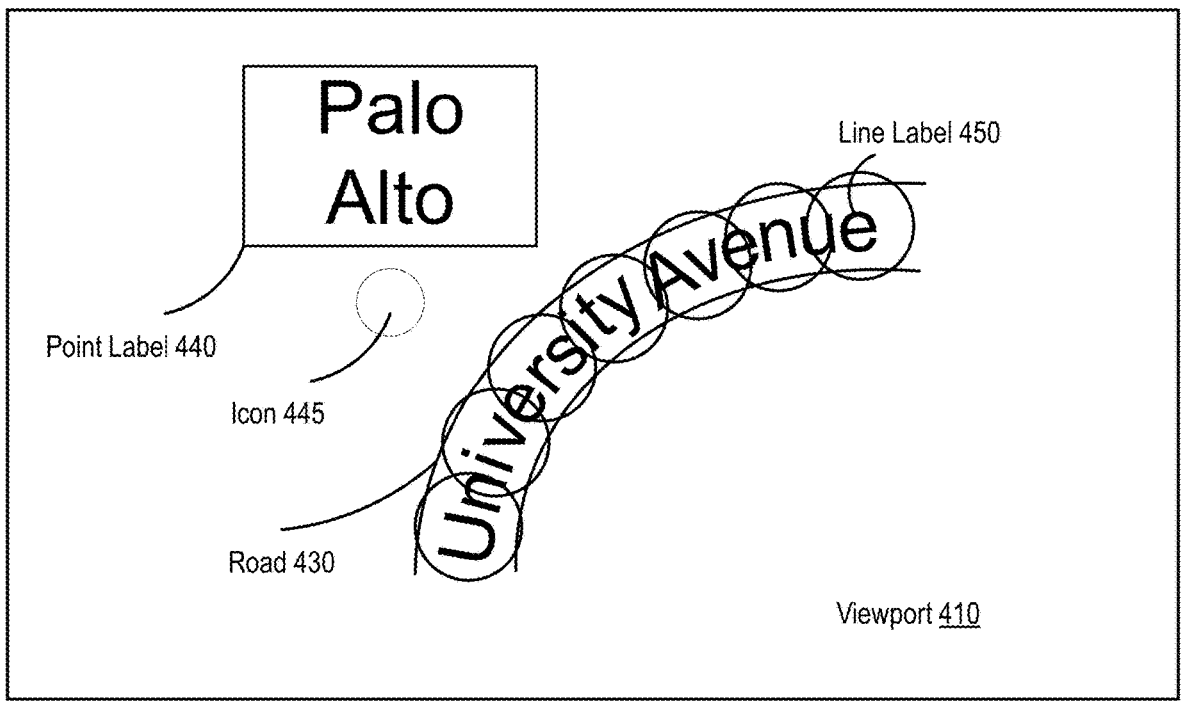
FIG. 4A illustrates a first example of two labels and their respective bounding geometries, according to one embodiment.
Figure 4B:
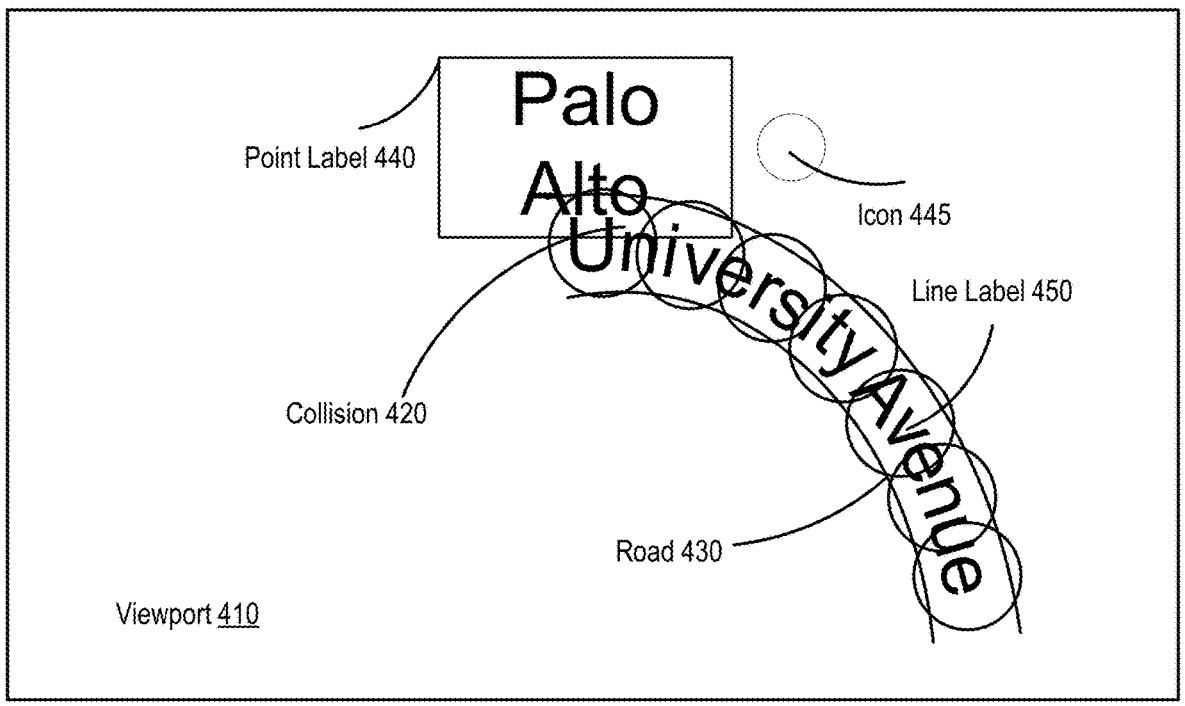
FIG. 4B illustrates a second example of two labels and their respective bounding geometries, according to one embodiment.

FIG. 4A illustrates a first example of two labels and their respective bounding geometries, according to one embodiment. FIG. 4B illustrates a second example of two labels and their respective bounding geometries, according to one embodiment. Each has a viewport 410. A viewport 410 is the portion of an electronic map that is rendered and displayed upon a display 216 of a mobile computing device 150 at a given point in time. The viewport changes over time as the user interacts with the mobile computing device 150. For example, the user can pan, rotate, pitch, and/or zoom the map using input device 218 and/or cursor control 220 such that the viewport 410 displays a different portion of the electronic map, or a different view of the same portion of the electronic map. In an embodiment there are two kinds of labels, point labels like point label 440 and line labels like line label 450.

Each of the illustrated example viewports 410 also has an icon 445, a point label 440, a road 430, and a line label 450. The icon 445 is a graphical element visualizing a map feature, such as a city, upon the portion of the electronic map rendered and displayed in the viewport 410. Point labels 440 and line labels 450 are vector data. Point label 440 is a label for the map feature visualized by the icon 445, which in this example is the city Palo Alto. The point label 440 includes a text string "Palo Alto" and a rectangular bounding geometry surrounding the text. When detecting collisions between labels, whether point or line labels, bounding geometries are used, rather than the shape of the text itself. Bounding geometries are simplifying geometries that allow for collision detection using less complex techniques than if the more complex geometries of text strings themselves are used.

Bounding geometries are fitted to the text string such that the bounding geometry encapsulates the text string. In an embodiment, the text string of a point label is rendered such that it takes as little of the viewport 410 as possible and is as rectangular as possible. For example, the point label 440 has "Palo" above "Alto" to create a more compact and rectangular label than having the words side by side. Alternatively, in some embodiments, text strings are constrained by a maximum width. In such embodiments, line breaks in text strings are arranged to minimize the area of the bounding geometry. Bounding geometries, in contrast to text strings, are neither rendered nor displayed. The point label 440 is placed at a fixed location within the viewport 410 near the icon 445. The fixed location is determined by an anchor, which is vector data indicating a position near the icon 445 where the point label 440 should be placed if there is space for it.

Point labels 440 in general can include any of a plurality of text strings, and can be fixed to an anchor at any of a plurality of points upon the electronic map near an associated icon 445. In some embodiments, point labels 440 are oriented to the viewport plane, rather than the plane of the electronic map. If the electronic map is pitched to provide an isometric view, for example, the point label 440—the text string and rectangular bounding geometry—remain facing the viewport, and do not pitch with the rest of the electronic map. Similarly, point labels 440 are unaffected by rotation, and remain in the same relative location, oriented the same direction. A 180 degree rotation of the electronic map does not flip the text upside down, for example; the icon 445 and point label 440 may move, but the point label 440 remains at its location relative to the icon 445 and orientation relative to the viewport 410. Point labels are singular; duplicates are not rendered at the same time. In some embodiments, point labels 440 are oriented to the plane of the electronic map, in which case the point labels 440 move with the map, such as pitching as the map pitches. Orienting point labels 440 to the viewport plane is often preferable since such labels are often more legible than labels oriented to the map plane.

Road 430 is a graphical element representing a map feature, such as the road University Avenue in Palo Alto as in this example. Line label 450 is a label for the map feature visualized by road 430. The line label 450 includes a text string "University Avenue" and seven circles that form a bounding geometry for the line label 450. The text string of a line label is rendered such that it follows the curvature of the map feature it labels, whether it be a road, a river, a border, or so on. In this example, "University Avenue" is curved such that it follows the curve of road 430. Unlike point labels like point label 440, line labels like line label 450 are not fixed to any particular orientation. Rather, line labels 450 adjust such that they remain bound to the curvature of the map feature they label. The text string of the line label 450 is bounded by the seven circles that, like the text string, follow the course of the underlying geometry of the map feature. Though this example uses seven circles, any number of circles may be used such that the beginning and end of the text string are encapsulated, there is not more than a first threshold distance between adjacent circles, and there is not more than a second threshold amount of overlap between any two circles. The thresholds are set by the collision handling module 170 and depend upon the size of the circles, which in turn may depend upon the size of the characters of the text string. In an embodiment, there is one circle per character of the text string.

Unlike point labels 440, line labels 450 have multiple anchors, one per circle. These anchors are fixed to the underlying geometry of the labeled map feature, such as the circles of line label 450 with road 430. If the road 430 rotates, for example, the circles rotate as well, as does the text string. Furthermore, there may be duplicates of line labels. For example, if a road 430 crosses the entire viewport 410, it can be labeled several times at various locations along the road. These duplicates each have a minimum zoom level at which they may be rendered, thereby ensuring adequate spacing between duplicate labels. The minimum zoom levels are managed by and may be set by the collision handling module 170. Minimum zoom levels are set such that fewer labels appear at lower zoom levels (a farther out view, the viewport visualizing a greater geographic area) and more appear at higher zoom levels (a closer view, the viewport visualizing a smaller geographic area).

Depending upon the embodiment, line labels 450 may be fixed in orientation to the viewport (like point labels 440), or may be fixed to the electronic map, adjusting as it is pitched. In such latter embodiments, the bounding geometry may be re-determined by the collision handling module 170 upon adjustment of the electronic map to take into account the new perspective of the electronic map relative to the viewport. In general, determining bounding geometries takes into account the size and shape of the text or icon of the label being bound, and may further take into account a view angle as determined by the position of the electronic map in relation to the viewport. For example, if the electronic map is pitched such that the viewport adjusts from a top-down view of the electronic map to an isometric view of the electronic map, labels and therefore bounding geometries may tilt with the electronic map and, as a result, change in shape, such as reducing in 'height' or vertical aspect.

In FIG. 4A the point label 440 and line label 450 do not intersect. However, the electronic map may be rotated clockwise to result in the viewport 410 of FIG. 4B, in which case the point label 440 and line label 450 do intersect, at collision 420. Intersecting labels can be visually displeasing and difficult to discern from one another. Removing one of the intersected labels would likely cause the other one to be comprehensible and more useful to a user of the electronic map.

Using circles for line label 450 bounding geometries provides several benefits over rectangles while still allowing for efficient collision detection and handling. Circles are stable under rotation; when the map is manipulated, the circles may move, but they do not move relative to other features of the map. This is unlike rectangles which, when rotated, extend into regions of the electronic map not previously overlapped by those rectangles. This is because circles by definition have constant radius, whereas rectangles do not. Another benefit of using circles is the efficiency with which collision detection may be performed using them as compared to a complex polygon. Determining collisions between circles and circles, circles and rectangles, or rectangles and rectangles is much less rigorous than determining collisions among complex polygonal geometries (such as the actual shapes of text strings). For example, a dense network of roads with dozens to hundreds of line labels may require more time to process than is desirable; the use of bounding geometries to reduce the complexity of collision detection can reduce the time necessary to determine collisions and therefore improve the usability of the electronic map.

V. Grid Index

Figure 5:
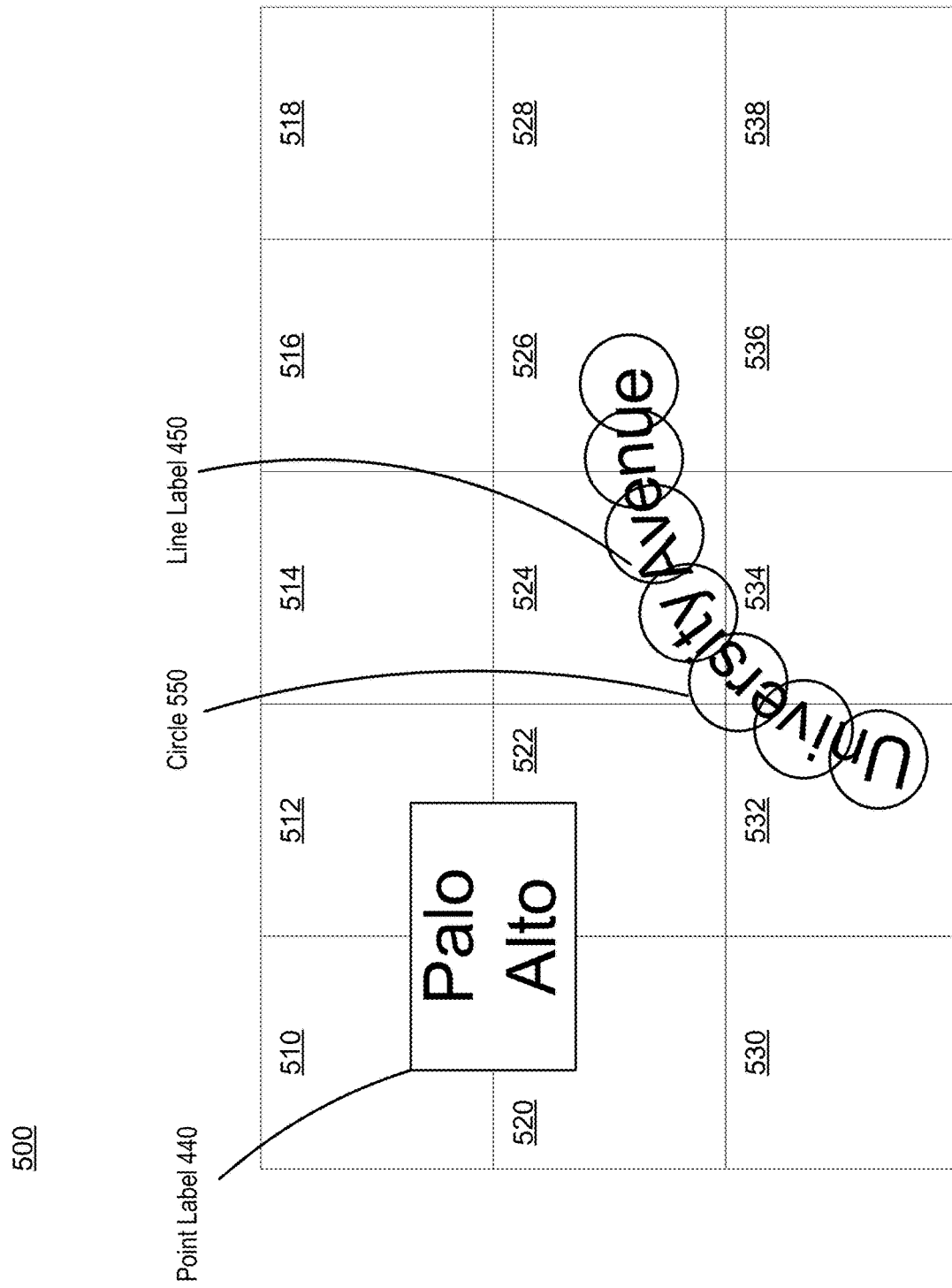
FIG. 5 illustrates a grid index and two labels, according to one embodiment.

FIG. 5 illustrates a grid index 500 and two labels, according to one embodiment. A grid index 500 is a representation of the viewport 410 that is displayed upon the display 216 of the mobile computing device 150 used to detect collisions among labels. The grid index 500 is part of the collision handling module 170, for example, as a data structure representing each pixel of the viewport 410, or a data structure representing the electronic map in terms of global coordinate space. The display 216 includes a plurality of pixels arranged in a grid. For example, the grid may be 600 pixels wide and 600 pixels long, with 360,000 pixels total. The grid index 500 maps to this grid, forming disjoint regions of the grid. For example, the grid index 500 could map the 600 by 600 pixel grid into 400 30-pixel-square disjoint regions (dividing the grid such that it is 20 disjoint regions wide and 20 disjoint regions long). Alternatively, the grid index 500 may map the 600 by 600 pixel grid into 400 disjoint regions of global coordinate space that split the global coordinate space into equal-area divisions. The size and number of disjoint regions depends upon the embodiment.

In one embodiment, the collision handling module 170 determines the size and number of disjoint regions based on the size of the bounding geometries of vector tiles being used and on the dimensions of the grid. For example, the collision handling module 170 determines disjoint regions such that each disjoint region is a square with a side length that is within a threshold number of pixels of twice the radius of the bounding geometry circles. For example, if the bounding geometry circles have an average radius of 16 pixels, the disjoint regions may each be 30 pixels wide and 30 pixels long. The threshold may be determined by the collision handling module 170 or may be set by an implementer of the system.

The grid index 500 improves label collision detection efficiency, and therefore label insertion. For example, when inserting a new label, rather than checking against all existing labels already in the grid index, only existing labels in disjoint regions intersected by the new label need be checked. As such, increasing the dimensions of the grid index 500 and/or the number of entries does not significantly impact the amount of computing resources necessary to insert a new label. This is because, for any given insertion, finding the intersected disjoint regions is nearly constant, and the number of existing labels within those disjoint regions to compare against is a function of the density of the grid index 500, in terms of labels, rather than its overall size. This density is limited by a number of labels that can fit in a disjoint region, rather than by a size of the grid index 500, and therefore is independent of the size of the grid index. For example, if no label is large enough to intersect more than 4 disjoint regions, and each disjoint region cannot fit more than 3 labels, there will not be more than 12 labels to compare against for any label insertion, regardless of the size of the grid index 500 overall. As such the size of the grid index does not significantly impact the efficiency of label collision detection, allowing near-constant-time label insertion and collision detection per label.

The grid index 500 in the embodiment of FIG. 5 maps to a display 216 with a pixel grid 30 pixels wide and 50 pixels long, and includes 15 disjoint regions. Each disjoint region maps to 100 pixels (a 10 pixel by 10 pixel square). Point label 440 is positioned within the viewport such that it intersects four disjoint regions (disjoint regions 510, 512, 520, and 522). Similarly, line label 450 is positioned within the viewport such that it intersects five disjoint regions (disjoint regions 522, 524, 526, 532, and 534). Disjoint regions 514, 16, 518, 528, 530, 536, and 538 are not intersected by either label. The only disjoint region intersected by both point label 440 and line label 450 is disjoint region 522. Specifically, the rectangular bounding geometry of point label 440 and circle 550 of the circular bounding geometries of line label 450 intersect disjoint region 522. As such, disjoint region 522 is the disjoint region that the collision handling module 170 checks for a collision between Point Label 440 and Line Label 450, as described below with respect to FIG. 6.

Figure 6A:
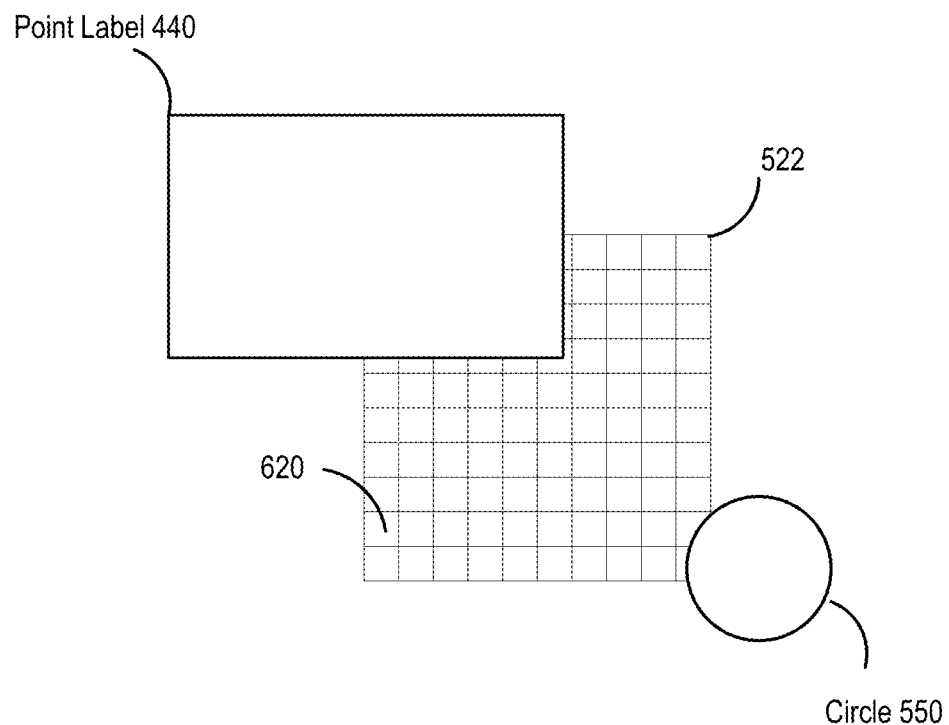
FIG. 6A illustrates a grid index cell intersected by two bounding geometries, according to one embodiment.
Figure 6B:
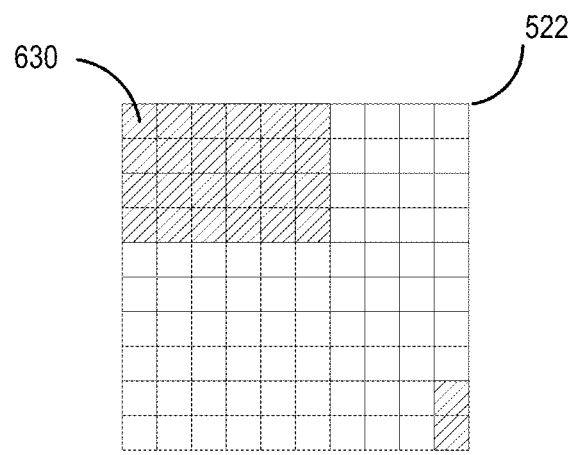
FIG. 6B illustrates a grid index cell with individual pixels marked as used, according to one embodiment.

FIG. 6A illustrates a grid index cell intersected by two bounding geometries, according to one embodiment. More specifically, it illustrates the bounding geometries of point label 440 and circle 550, as well as the pixels of disjoint region 522. The disjoint region 522 maps to pixels of the grid, such as pixel 620, which is not intersected by either bounding geometry. FIG. 6B illustrates a grid index cell with individual pixels marked as used, according to one embodiment. The pixels of disjoint region 522 in FIG. 6A that are intersected by either of the two bounding geometries are distinguished from non-intersected pixels. For example, pixel 630 is intersected by the bounding geometry of point label 440 and is illustratively distinguished in the Figure from non-intersected pixels, such as pixel 620, using diagonal lines. As shown in FIG. 6B, point label 440 and circle 550 do not collide, as no pixel is used by each ("overlaps" or "intersects"). Techniques to identify collisions, as well as the grid index 500 in general, are discussed in detail infra in section VI. Label Insertion.

In the interest of clarity, the present disclosure details label collision detection using pixel-based techniques. In other embodiments label collision detection is performed using other coordinate techniques. For example, in an embodiment disjoint regions are defined in terms of global coordinates, bounding geometries are likewise in terms of global coordinates, and label collision detection is performed using global coordinate-based techniques. For example, each bounding geometry is defined by global coordinate bounds, such as four points in global coordinate space that marks the corners of a rectangular bounding geometry, or a point in global coordinate space and a radius that are used to define a circular bounding geometry. In such embodiments, rather than marking pixels, it is instead the bounding geometries that are marked, and/or portions of disjoint regions of the grid index, defined in terms of global coordinates. Alternatively, for example, a coordinate system defined with respect to the viewport may be used, with techniques similar to global coordinate-based techniques. In an embodiment, the viewport coordinate system is based on the global coordinate system.

VI. Label Insertion

Figure 7:
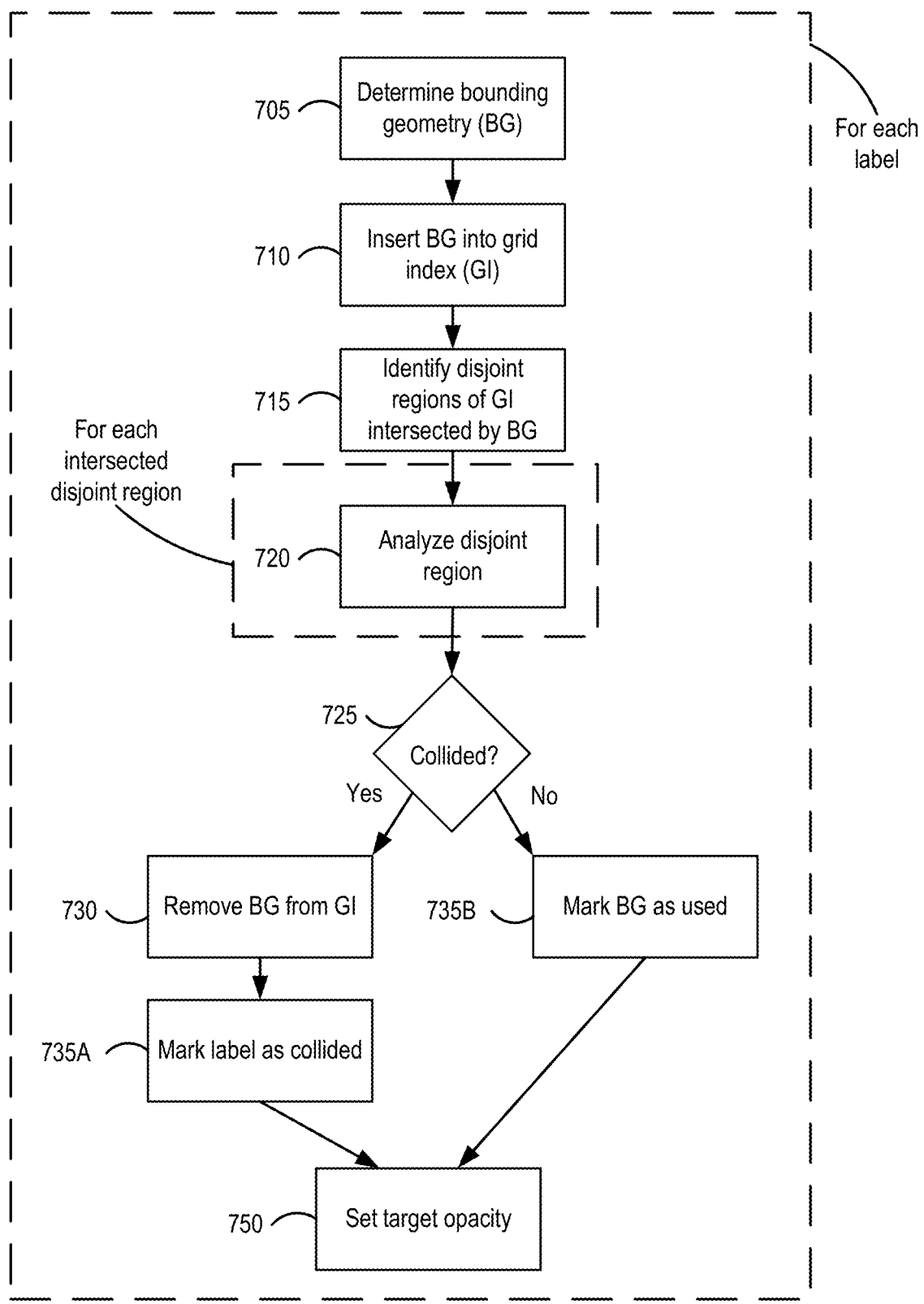
FIG. 7 illustrates a process to insert a label into a grid index, according to one embodiment.

FIG. 7 illustrates a process to insert a label into a grid index, according to one embodiment. The process is performed for each label in a set of labels of a vector tile. For example, for each front-most vector tile of an electronic map, each label is inserted in order by layer, as detailed supra. Prioritization by layer can ensure that labels considered more important to a creator of the electronic map are rendered rather than less important labels, especially in embodiments where there are more labels than there is available space for labels upon the map. For example, major highways may be prioritized over building names such that labels in a highway label layer are inserted before labels in a building name layer. If so, any time there is a region of the grid index where a highway label and a building label would overlap, the highway label is rendered and the building label is not. This is because the space is available until the highway label is placed, and thus is available to the highway label. However, at insertion of the building label, the space is already taken by the highway label, preventing insertion of and therefore rendering of the building label.

The collision handling module 170 determines 705 a bounding geometry for a label. Determining 705 the bounding geometry is based on the content of the label, its label type (whether it is a text string or an icon), conditions of the electronic map (e.g., pitch, rotation, and zoom), the style of the layer the label is in, and whether the label is a point label or a line label. For example, the length of a text string may factor into the length of the bounding geometry or a number of circles included in the bounding geometry. The bounding geometry is determined 705 such that it fits to the label within a threshold amount (e.g., in units of distance such as pixels), thereby enabling the bounding geometry to accurately represent the label during collision detection.

The collision handling module 170 inserts 710 the bounding geometry into the grid index. The bounding geometry requires a certain amount of space in the grid index, such as a number of pixels or a certain area defined in global coordinate space. The bounding geometry is also placed at a specific location in the grid index based on where it would be rendered in the electronic map. For example, at the location of an anchor as mapped to the grid index from the viewport. Once the bounding geometry is in its proper place, the collision handling module 170 identifies 715 disjoint regions of the grid index intersected by the bounding geometry. For example, as detailed supra, the bounding geometry of line label 450 intersects disjoint regions 522, 524, 526, 532, and 534 of grid index 500 in FIG. 5. The disjoint regions intersected by the bounding geometry depend upon the size and location of the label within the electronic map with respect to the viewport, which the grid index maps to. In an embodiment, inserting 710 the bounding geometry does not include adding it to the rendered electronic map and/or grid index, but rather checking whether the bounding geometry would intersect other geometries if it were added.

The collision handling module 170 analyzes 720 each disjoint region intersected by the bounding geometry to determine whether the portion of the disjoint region taken by the bounding geometry overlaps a portion of any other geometry already within the disjoint region. For example, disjoint region 522 in FIG. 6 is intersected by the bounding geometries of point label 440 and line label 450. The two geometries take up different pixels within the disjoint region 522 and therefore do not overlap. As such the labels do not intersect at this disjoint region. Alternatively, for example, a rectangle bounding geometry with global coordinate corners (0,0), (0,10), (10,0), and (10,10), and a circle bounding geometry with global coordinate center (12, 1) and radius of 3, intersect due to overlapping coordinate space, as the circle extends into area within the rectangular bounding geometry such as at (9,1). Therefore whichever of the two geometries is inserted second is not added to the grid index, nor is it added to the rendered electronic map.

Once the collision handling module 170 has analyzed 720 each disjoint region intersected by the bounding geometry, it determines 725 whether the bounding geometry collides with another geometry within the grid index. If the analysis 720 of any of the analyzed disjoint regions determines that the bounding geometry overlaps another geometry in at least one of the analyzed disjoint regions, the bounding geometry as a whole is considered to be collided. One geometry overlaps another when its placement requires occupation by the one geometry of a portion of the grid index already occupied by another geometry. For example, a pixel already used by another geometry, or an area within global coordinate space already occupied by another geometry. Upon determining via analysis 720 that the bounding geometry is collided, the bounding geometry is removed 730 from the grid index and the label is marked 735A as collided. As such, the label is not rendered in the electronic map. In an embodiment, the label is marked 735A as collided in an index, such as a cross tile symbol index (CTSI), as detailed infra. Alternatively, in other embodiments, the label may be marked 735A at the grid index or at the vector tile, or the label itself may be altered to represent that it is marked 735A.

If instead the collision handling module 170 determines 725 that the bounding geometry does not collide with another geometry at any disjoint region intersected by the bounding geometry, the collision handling module 170 marks 735B the bounding geometry as used. As such, the label is rendered in the electronic map. Similar to the collided case, depending upon the embodiment, the label may be marked 735B at the CTSI, the grid index, or at the vector tile, or the label itself may be altered to represent that it is marked 735B.

Based on whether or not the bounding geometry collides with another geometry in the grid index, the collision handling module 170 sets 750 a target opacity associated with the label. If the bounding geometry collides with another geometry, the target opacity is set to indicate the label should not be rendered, or is to be rendered as wholly transparent. Alternatively, if the bounding geometry does not collide with another geometry, the target opacity is set to indicate the label should be rendered, or is to be rendered as opaque. Opacity is further discussed infra and impacts label rendering and animation. In an embodiment, the target opacity is recorded in the CTSI.

VII. Duplicate Detection

Figure 8:
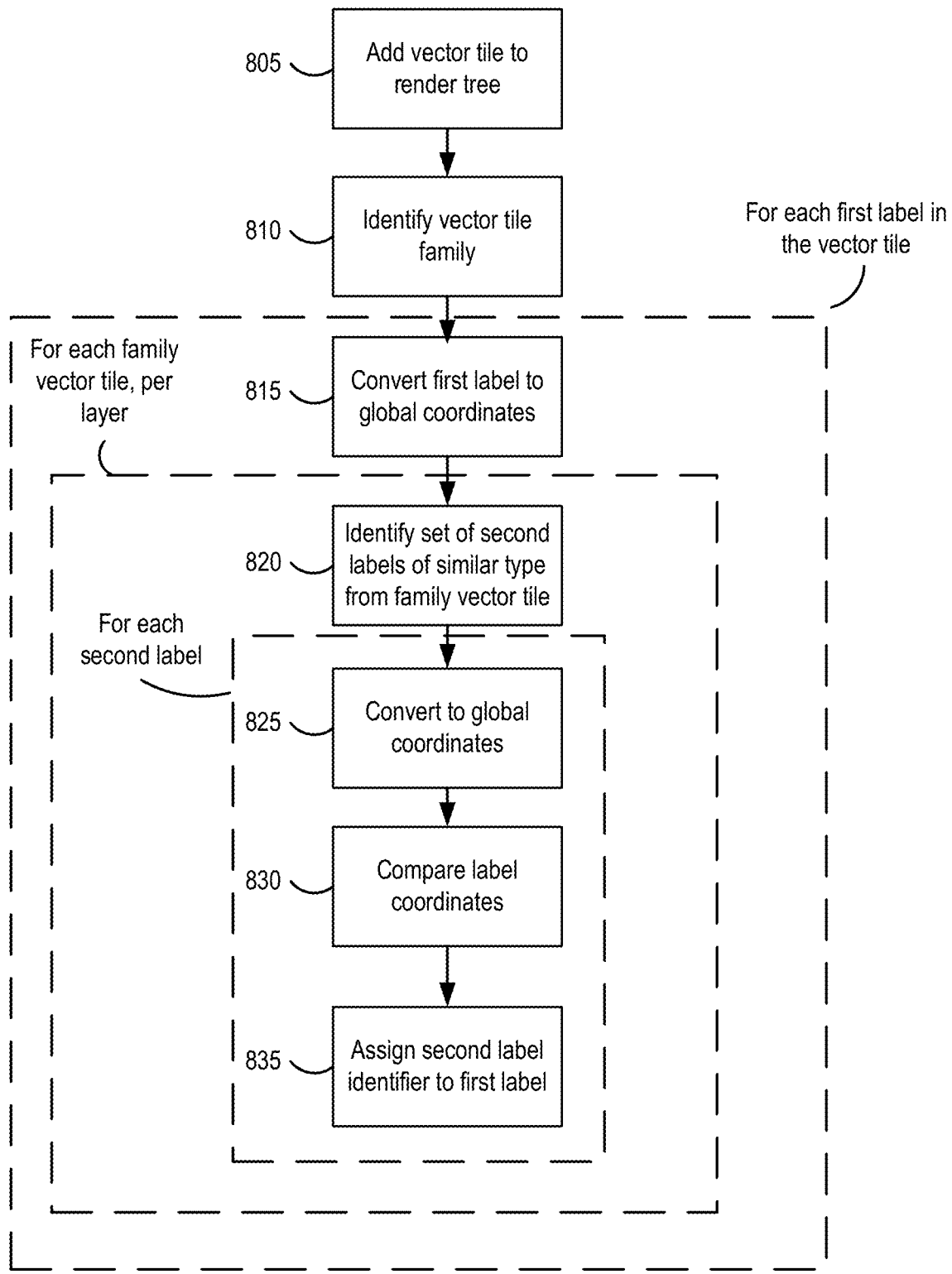
FIG. 8 illustrates a process to add a vector tile to a tile pyramid and detecting label duplicates therein, according to one embodiment.

FIG. 8 illustrates a process to add a vector tile to a tile pyramid and detecting label duplicates therein, according to one embodiment. In some embodiments vector data includes duplicate labels, such as labels for a map feature from different vector data sources, e.g. third party sources external to the system 100. Alternatively, duplicate labels may arise from vector tiles of different zoom levels representing the same geographic area and both existing in the render tree, or from a label for the same map feature existing in multiple layers.

The CTSI is an index that coordinates labels across tiles and layers. Each label in the render tree is recorded in the CTSI; if a vector tile is removed from the render tree, its labels are removed from the CTSI, and when a vector tile is added to the render tree, its labels are added. In an embodiment the CTSI is updated each time a vector tile is added to or removed from the render tree. Each label in the CTSI has a cross tile identifier (CTID). Duplicate labels are assigned the same CTID. For example, a first "University Avenue" label in a first layer has CTID 00005 in the CTSI, and a second "University Avenue" label in a second layer also has CTID 00005 in the CTSI. When a vector tile is added to the render tree, each label is checked to determine whether it is a duplicate, and if so it is assigned the correct CTID. The CTSI records, for each CTID, a current opacity and a target opacity. Opacities are further discussed infra in section VIII. Label Animation.

The collision handling module 170 adds 805 a vector tile to the render tree. The collision handling module 170 then identifies 810 the vector tile's vector tile family within the render tree. Duplicate labels arise from other vector tiles in the vector tile family; therefore the vector tile family needs to be checked against for duplicative labels. For each label in the added vector tile (each "first label"), the first label's vector tile coordinates are converted 815 to global coordinates. In an embodiment, the global coordinates are rounded down. The following steps of the process are performed for each vector tile in the vector tile family, per layer, for each first label.

For the vector tile in the vector tile family, each label in the layer of similar type to the first label (e.g., text or icon) is identified 820 by the collision handling module 170. Then, for each label in the layer of similar type (each "second label"), the second label's vector tile coordinates are converted 825 to global coordinates by the collision handling module 170. In an embodiment, the global coordinates are rounded down. The collision handling module 170 compares 830 the global coordinates of the first label and each second label. For each second label, if the collision handling module 170 determines based on the comparison 830 that the first label and second label are within a global coordinate threshold of each other, the first label is assigned 835 the second label's CTID in the CTSI and thereby treated as a duplicate. Though this embodiment describes one possible method for detecting duplicate labels, other methods can also be used to achieve the same result.

In some embodiments, labels of different types are identified as duplicate differently. For example, icon labels, such as a tree icon for a forest, are identified as duplicative according to the process detailed supra, whereas text labels are identified as duplicative based on a comparison of the first label's text to the text of the second label. In such embodiments, it is the text comparison (performed, for example, by the collision handling module 170) that determines whether or not text labels are duplicative, rather than global coordinates. In an embodiment, both the text and coordinates of a text label are used to determine whether the text label is a duplicate.

VIII. Label Animation

Figure 9:
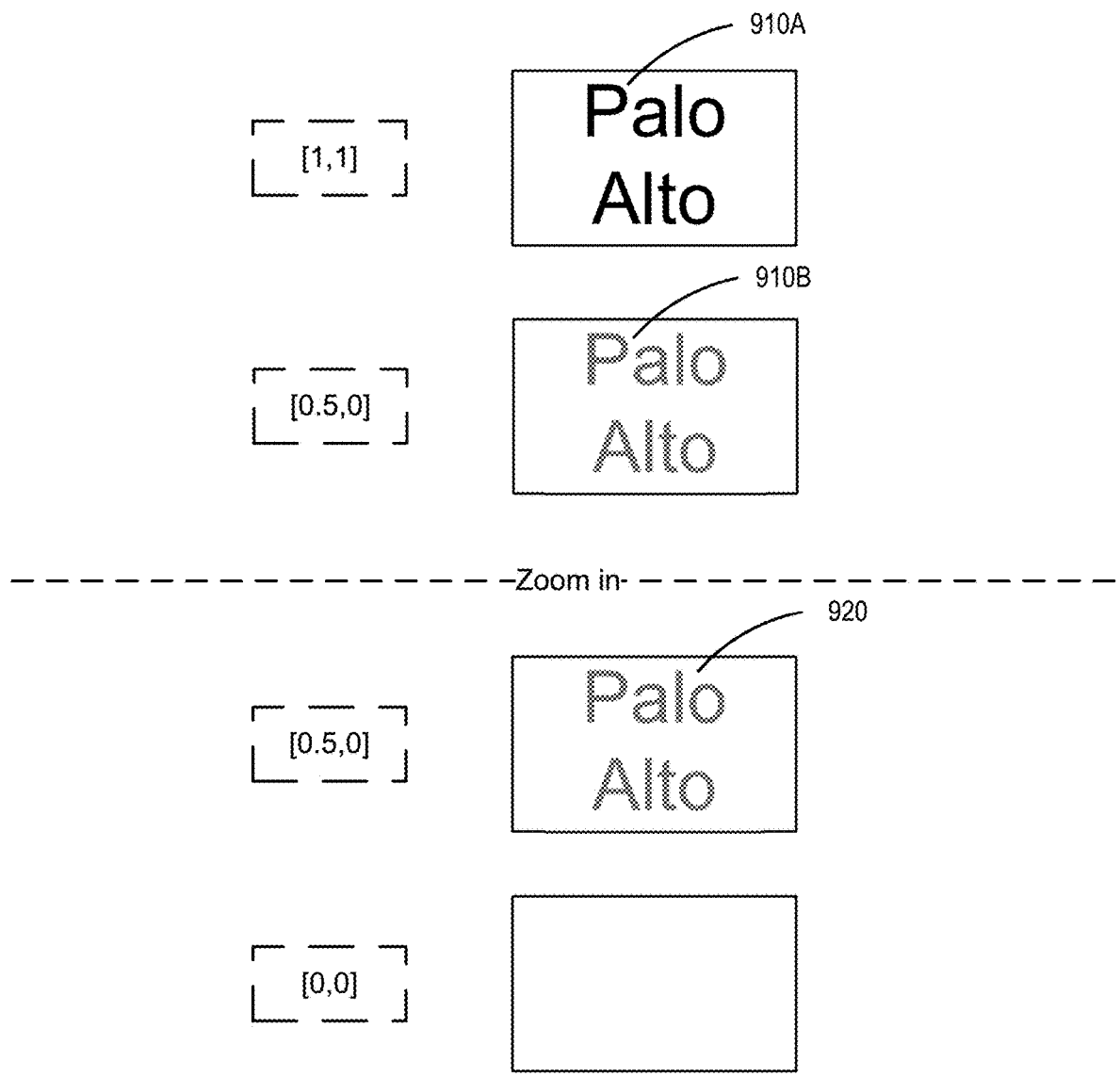
FIG. 9 illustrates fading a label in or out upon an electronic map, according to one embodiment.

FIG. 9 illustrates fading a label in or out upon an electronic map, according to one embodiment. In an embodiment, rather than fully rendering immediately, labels fade in or out as they are added to or removed from the rendered electronic map. As detailed supra, labels of front-most vector tiles are rendered. If an electronic map is zoomed in, the front-most vector tile may change from a z4 to a z5 vector tile, for example. A label may be duplicated by being in both the z4 and z5 vector tiles. For example, a city name label may be in vector tiles at both zoom levels. Fading out the z4 label and fading in the z5 label may be visually displeasing to a user of the electronic map. As such, enabling the z5 label to inherit the fade state of the z4 label allows for continuous rendering of labels across zoom levels, which may be more visually appealing to a user of the electronic map.

As detailed supra, each CTID is associated with a current opacity and a target opacity, the latter of which is set during label collision detection. The current opacity is a level of fade of the label associated with the CTID and the target opacity is what the current opacity is fading towards—either fading in or fading out. For example, if "1" represents a fully faded in or rendered label and "0" represents a fully faded out or transparent label, having a (current opacity, target opacity) pair of (0,0) indicates a label is both not rendered and is not fading in, (0,1) indicates a label is not rendered but is fading in, (1,0) indicates a label is rendered but is fading out, and (1,1) indicates a label is rendered and is to remain rendered. The current opacity updates over time, towards the target opacity, to animate the fade effect. Depending upon the embodiment, the current opacity updates at rate based on a frame rate of the display 216 of the mobile computing device 150, or a rate based on the clock rate of the processor 204 or GPU 206 of the mobile computing device 150. In an embodiment, the GPU 206 of the mobile computing device 150 interpolates between the current and target opacities, and the interpolated opacity is the opacity actually displayed. In an embodiment, the current opacity is only recorded in the CTSI with the performance of collision detection, though it updates (and is rendered) at the rate based on the frame rate or clock rate.

The example of FIG. 9 illustrates label animation according to one embodiment. The rendered electronic map includes a "Palo Alto" label 910A that is associated in the CTSI with opacity parameters (1,1). The collision handling module 170 performs collision detection and determines the label 910A intersects another label and therefore sets label 910A's target opacity to 0. As such the label 910A begins fading out, losing opacity each time the display 216 of the mobile computing device 150 refreshes. The collision handling module 170 again performs collision detection, recording the current opacity at 0.5, indicating the label 910B is half way faded out. The electronic map is then zoomed to a higher zoom level where there is also a "Palo Alto" label. As such, this label is assigned the same CTID as the original "Palo Alto" label. Hence, when this new label is rendered at 920, it inherits the fade of the original label, (0.5,0). In this way, label fading remains smooth across zoom levels. The label 920 continues to fade out, eventually completely disappearing from the rendered electronic map. When collision detection runs again, the recorded current opacity is updated to (0,0).

In an embodiment, when a label is added to the CTSI, it is assigned an initial set of opacity parameters, such as (0,0). If there are no duplicate labels for a label added to the CTSI, it is assigned a new CTID. When a vector tile is removed from the render tree, its labels are removed from the CTSI; if any of the removed labels were the last in the CTSI with a respective CTID, those CTIDs are recycled for the next one or more new labels entered in the CTSI.

IX. Additional Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method to determine label duplication, the method comprising:
    adding a vector tile to a render tree of an electronic map, wherein the vector tile comprises a first set of labels and a particular label of the first set of labels comprises a type of label;
    identifying a vector tile family of the vector tile, wherein a certain vector tile of the vector tile family comprises a second set of labels;
    converting coordinates of the particular label to global coordinates;
    identifying a label of the second set of labels comprising the type of label;

comparing the global coordinates of the particular label to coordinates of the identified label to determine whether the global coordinates of the particular label and the coordinates of the identified label are within a threshold similarity of each other; and responsive to determining that the global coordinates of the particular label and the coordinates of the identified label are within the threshold similarity of each other, associating the particular label with an identifier with which the identified label is associated.

2. The method of claim 1, further comprising:
detecting a change to the electronic map;
wherein adding the vector tile to the render tree is responsive to detecting the change.

3. The method of claim 2, wherein the detected change is at least one of a pan, a pitch, a rotation, and a zoom.

4. The method of claim 1, wherein at least one of the vector tile and one or more vector tiles of the vector tile family further comprises vector data from a plurality of third party sources.

5. The method of claim 1, further comprising:
wherein the particular label is associated with the identifier in an index;
wherein the index maintains a current opacity and a target opacity for each identifier, wherein labels associated with the same identifier share one current opacity and one target opacity; and
rendering the particular label of the first set of labels using the shared current opacity and shared target opacity of the identifier.

6. The method of claim 5, wherein the index is a cross tile symbol index.

7. The method of claim 5, further comprising:
setting the particular label as a front-most label; wherein only front-most labels are rendered.

8. The method of claim 7, further comprising setting the identified label as a non-front-most label.

9. The method of claim 5, wherein rendering the particular label further comprises:
sending for display at a computing device the particular label with an opacity based on the current opacity;
updating the current opacity based at least in part on a clock parameter and the target opacity; and
sending for display at a computing device the particular label with an opacity based on the updated current opacity.

10. The method of claim 9, wherein collision detection is performed periodically, wherein the clock parameter is reset responsive to performance of collision detection.

11. The method of claim 9, wherein the clock parameter is updated based on a frame rate of a display of the computing device.

12. The method of claim 5, further comprising:
identifying that a first vector tile is removed from the render tree; and
for a label of the first vector tile:
removing, from the index, an association with an identifier.

13. The method of claim 12, further comprising:
removing an identifier from the index responsive to removing, from the index, a sole association with the identifier; and
responsive to removing the identifier, removing, from the index, a current opacity and a target opacity maintained for the removed identifier.

14. The method of claim 1, wherein comparing the global coordinates of the particular label to global coordinates of the identified label further comprises converting coordinates of the identified label to global coordinates.

15. The method of claim 1, wherein converting coordinates of a label to global coordinates comprises:
determining a relationship between the coordinates and the global coordinates;
multiplying the coordinates by a factor based on the determined relationship; and
rounding the multiplied coordinates.

16. The method of claim 15, wherein the relationship is based at least in part on a zoom level of the label.

17. The method of claim 1, wherein the vector tile family comprises parents and children of the added vector tile that are in the render tree.

18. The method of claim 1, wherein the type of label is at least one of a text string and an icon.

19. A method comprising:
adding a vector tile to a render tree of an electronic map, wherein the vector tile comprises a first set of labels and a particular label of the first set of labels comprises a type of label;
identifying a vector tile family of the vector tile, wherein each vector tile of the vector tile family comprises a second set of labels;
converting coordinates of the particular label to global coordinates;
identifying a label of the second set of labels comprising the type of label;
comparing the global coordinates of the particular label to coordinates of the identified label to determine whether the global coordinates of the particular label and the coordinates of the identified label are within a threshold similarity of each other; and
responsive to determining the global coordinates of the particular label are not within a threshold similarity of the coordinates of the identified label, marking the particular label as a new label.

20. The method of claim 19, wherein marking the particular label as a new label comprises:
associating the particular label with a distinct identifier; and
assigning the distinct identifier a first current opacity and a first target opacity.

* * * * *